United States Patent
Combee

(10) Patent No.: US 8,963,549 B2
(45) Date of Patent: Feb. 24, 2015

(54) ELECTROMAGNETIC MEASUREMENTS USING A GROUP OF TWO OR MORE ELECTROMAGNETIC RECEIVERS

(75) Inventor: Leendert Combee, Sandvika (NO)

(73) Assignee: WesternGeco L.L.C., Houston, TX (US)

( * ) Notice: Subject to any disclaimer, the term of this patent is extended or adjusted under 35 U.S.C. 154(b) by 685 days.

(21) Appl. No.: 12/966,604

(22) Filed: Dec. 13, 2010

(65) Prior Publication Data

US 2012/0146649 A1 Jun. 14, 2012

(51) Int. Cl.
*G01V 3/15* (2006.01)
*G01V 3/08* (2006.01)

(52) U.S. Cl.
CPC .................................. *G01V 3/083* (2013.01)
USPC ........................................................ 324/365

(58) Field of Classification Search
USPC ........................................................ 324/365
See application file for complete search history.

(56) References Cited

U.S. PATENT DOCUMENTS

| | | | |
|---|---|---|---|
| 4,617,518 A * | 10/1986 | Srnka ............................ | 324/365 |
| 6,651,007 B2 | 11/2003 | Ozbek | |
| 6,684,160 B1 | 1/2004 | Ozbek et al. | |
| 6,876,599 B1 | 4/2005 | Combee | |
| 7,328,109 B2 | 2/2008 | Iranpour et al. | |
| 7,446,535 B1 | 11/2008 | Tenghamn et al. | |
| 7,671,598 B2 * | 3/2010 | Ronaess et al. ............... | 324/365 |
| 7,834,632 B2 | 11/2010 | Tenghamn et al. | |
| 8,008,921 B2 * | 8/2011 | Alumbaugh et al. ......... | 324/365 |
| 8,575,938 B2 * | 11/2013 | Karlsen et al. ................ | 324/365 |
| 2004/0013036 A1 | 1/2004 | Fageras et al. | |
| 2004/0108854 A1 | 6/2004 | Nichols | |
| 2006/0238200 A1 | 10/2006 | Johnstad | |
| 2008/0169817 A1 * | 7/2008 | Morrison et al. ............. | 324/365 |
| 2010/0171501 A1 * | 7/2010 | Alumbaugh et al. ......... | 324/334 |

OTHER PUBLICATIONS

International Search Report and Written Opinion issued in PCT/US2011/064158 on Jul. 31, 2012, 9 pages.

* cited by examiner

*Primary Examiner* — Jay Patidar
(74) *Attorney, Agent, or Firm* — Kevin B. McGoff

(57) ABSTRACT

To survey a subterranean structure, for acquiring an electromagnetic (EM) measurement signal across EM receivers having a target axial spacing, a group of more than two EM receivers in an interval defined by the target axial spacing along a sensor cable is provided. The spacing between successive ones of at least some EM receivers in the group is less than the target axial spacing. EM measurements are acquired using the EM receivers in the group.

14 Claims, 6 Drawing Sheets

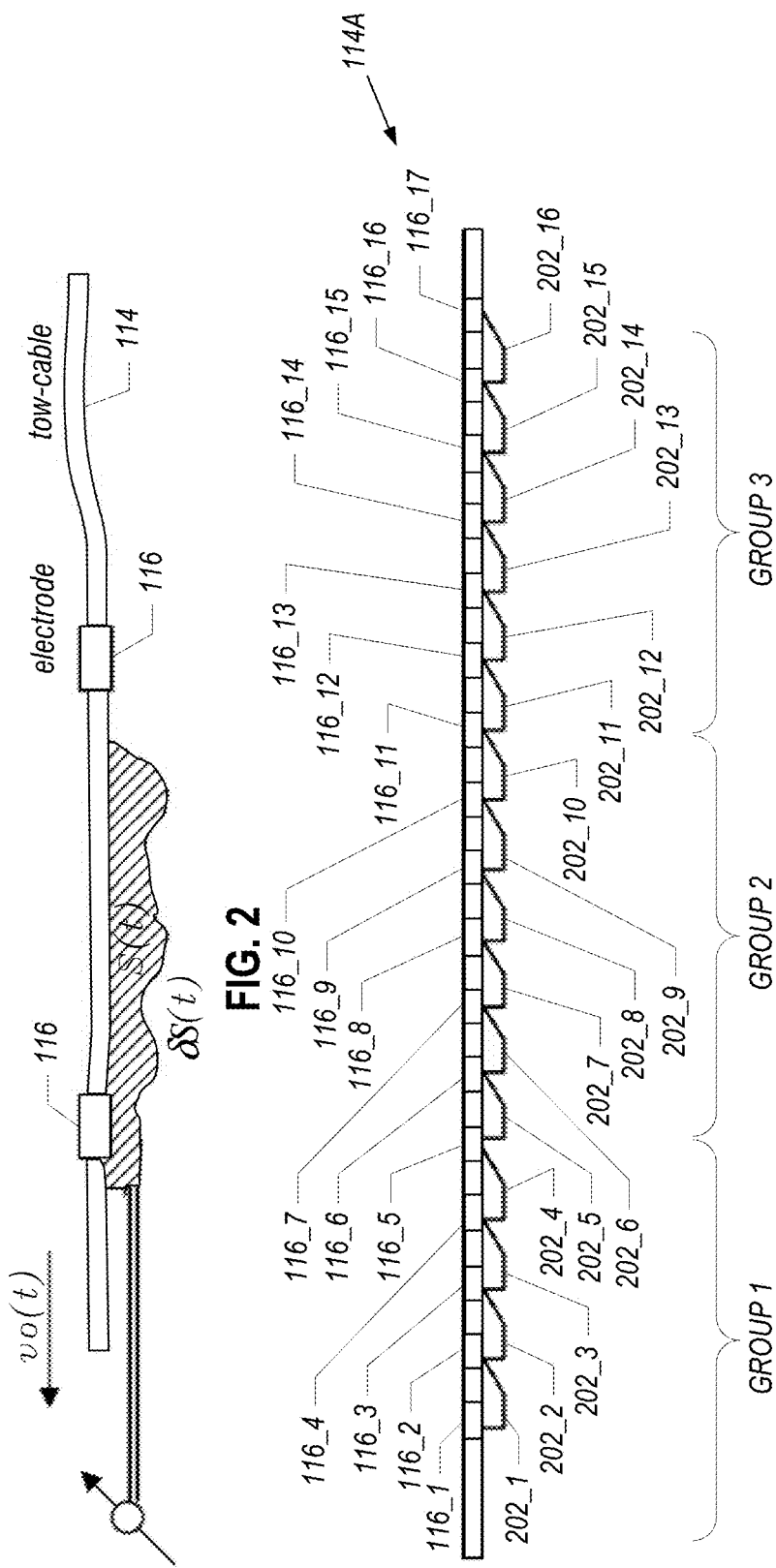

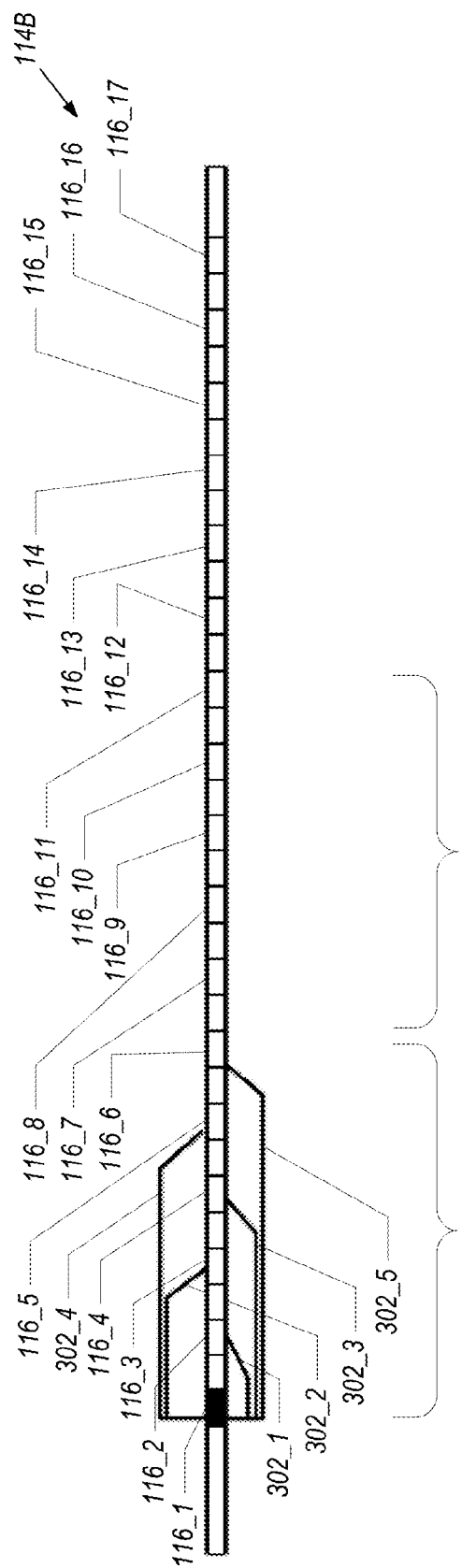
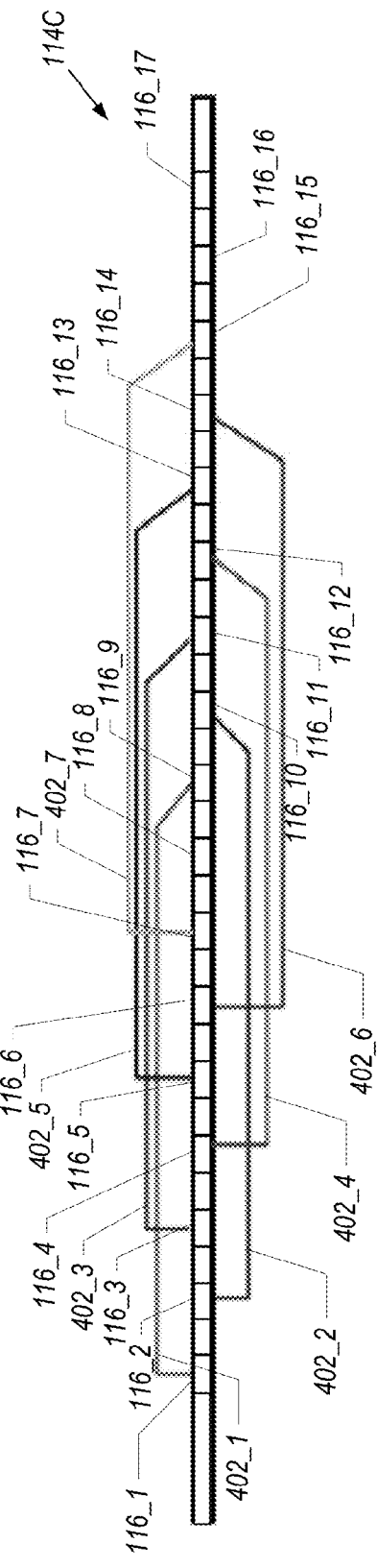
FIG. 4
FIG. 5

ELECTROMAGNETIC MEASUREMENTS USING A GROUP OF TWO OR MORE ELECTROMAGNETIC RECEIVERS

BACKGROUND

Electromagnetic (EM) techniques can be used to perform surveys of subterranean structures for identifying elements of interest. Examples of elements of interest in a subterranean structure include hydrocarbon-bearing reservoirs, gas injection zones, thin carbonate or salt layers, and fresh-water aquifers. One type of EM survey technique is the controlled source electromagnetic (CSEM) survey technique, in which an EM transmitter, called a "source," is used to generate EM signals. Surveying units, called "receivers," are deployed within an area of interest to make measurements from which information about the subterranean structure can be derived. The EM receivers may include a number of sensing elements for detecting any combination of electric fields, electric currents, and/or magnetic fields.

In some implementations, the EM receivers can be towed by a tow cable through a body of water. An issue associated with towing EM receivers through a body of water is that noise can be generated that can interfere with accurate measurement by the EM receivers. One form of noise is caused by cable vibrations, which cause traveling mechanical waves along the tow cable. Tow cable vibrations can cause vibrations of electrical wires within the tow cable, which can result in inaccuracy in EM measurements.

SUMMARY

In general, according to an embodiment, a method of surveying a subterranean structure comprises arranging a group of electromagnetic (EM) receivers with spacings that are less than a target spacing for which acquisition of an EM measurement signal is desired. Measurements collected by the EM receivers having reduced spacing are processed, such as by using an adaptive beamforming technique. In this manner, noise suppression can be achieved.

Alternatively, or in addition, a tow cable can be designed to reduce noise, such as by isolating movement of a tow cable from electrical wires contained in the tow cable, and/or by controlling the design parameters of the tow cable.

Other or alternative features will become apparent from the following description, from the drawings, and from the claims.

BRIEF DESCRIPTION OF THE DRAWINGS

Some embodiments of the invention are described with respect to the following figures:

FIG. 2 is a schematic diagram illustrating a portion of the sensor cable according to an embodiment;

FIGS. 3-5 illustrate various embodiments of a sensor cable;

DETAILED DESCRIPTION

Figure 1:
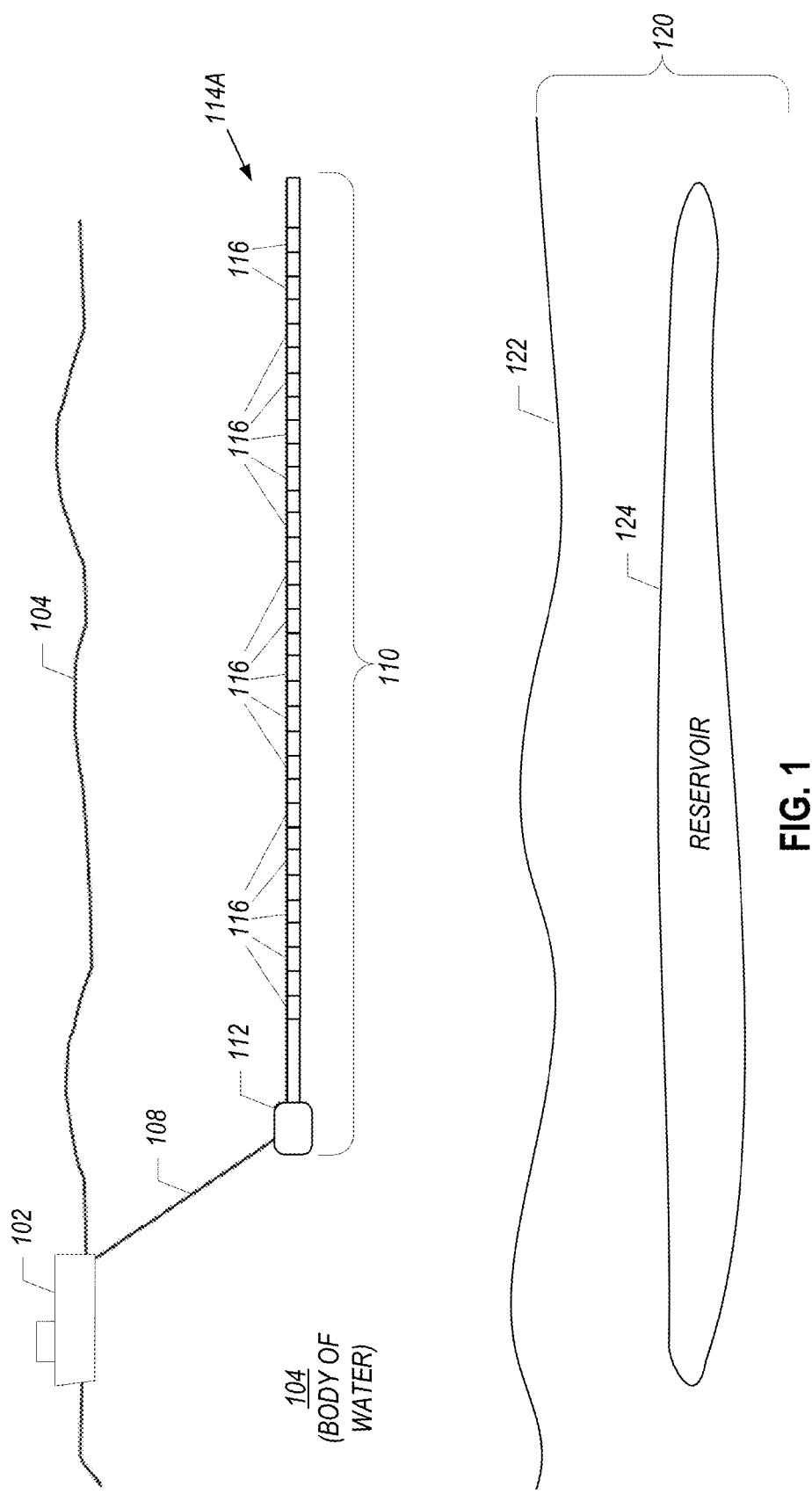
FIG. 1 is a schematic diagram of a marine survey arrangement that includes a sensor cable according to an embodiment.

In accordance with some embodiments, techniques are provided to achieve noise suppression to reduce noise effects on measurements collected by electromagnetic (EM) receivers that are arranged on a tow cable that is towed through a body of water. The EM receivers are used to perform a survey of a subterranean structure that may contain subterranean elements of interest, such as hydrocarbon-bearing reservoirs, gas injection zones, fresh-water aquifers, thin carbonate or salt layers, and so forth.

The techniques that can be used for noise suppression include a first technique in which the EM receivers are arranged to have a configuration that provides more EM receivers than are needed to acquire an EM measurement signal across EM receivers having a target axial spacing along the tow cable. For example, a survey operator may desire that EM measurements be collected by EM receivers that are spaced apart by target spacings of 300 meters (m). However, to achieve noise suppression, instead of providing EM receivers that are spaced apart by the target axial spacing (e.g., 300 m), some embodiments of the invention employ additional EM receivers. Thus, in accordance with an embodiment, in a physical interval of the tow cable that is defined by the target axial spacing (e.g., 300 m), more than two EM receivers are provided. The more than two EM receivers in the interval make up a group of EM receivers. Note that there may be multiple groups of EM receivers along a tow cable. In addition, it is noted that spacings between the EM receivers in the interval can also be selected to enhance noise suppression.

The measurements collected by EM receivers in each group are processed to form an EM measurement signal for the target axial spacing. In accordance with some embodiments, the processing applied on the measurements of the EM receivers in the group is an adaptive beamforming technique, which is described further below. In other embodiments, any other processing of the measurements of the EM receivers that allows separation of noise and signal can be used.

In addition to, or as an alternative from, the technique discussed above, another technique that is used for achieving noise suppression is to design the tow cable such that it has target mechanical characteristics. One such target mechanical characteristic is to provide dampening between the tow cable and electrical wires within the tow cable. Dampening enhances isolation between the tow cable and the electrical wires such that vibrations caused in the electrical wires due to vibrations of the tow cable are reduced.

The electrical wires provided inside the tow cable are connected to the EM receivers arranged on the tow cable. In one embodiment, a dampening medium can be provided inside the tow cable, where the electrical wires are placed in the dampening medium. This effectively reduces the amplitude of noise signals on the electrical wires caused by vibration of the tow cable. The dampening medium can be formed of a foam, a gel, a liquid, or any other type of dampening material.

In addition to providing mechanical isolation between the tow cable and the electrical wires, other mechanical characteristics of the tow cable can also be controlled. For example, the temporal (resonant) frequency of vibrations of the tow cable can be set as high as possible (above a target frequency threshold), and the amplitude of such vibrations is minimized. This can be achieved by using relatively slim tow cables of a material designed to minimize strumming Examples of such material include cable skins with a vortexreducing surface profile such as miniature fins. Providing a slim tow cable means that the diameter of the tow cable is reduced. Setting the resonant frequency to be as high as possible allows the resonant frequency of the vibration to be outside the band of interest that is the subject of EM measurements. Other properties of the tow cable that can be used to control the resonant frequency of the vibration include the weight and density of the tow cable.

Another mechanical characteristic of the tow cable that can be controlled is to reduce the velocity of the traveling noise wave along the tow cable. This can be achieved by controlling the tension of the tow cable, by adding mass to the tow cable, or increasing the stiffness of the tow cable. The tension and mass of the tow cable are governed in part by the diameter of the tow cable. Over the relevant frequency spectrum of interest for EM measurements, the noise velocity should be high enough to not be aliased and low enough (below a target velocity threshold) to be well outside the wavenumber spectrum of the signal of interest.

FIG. 1 illustrates an exemplary arrangement that includes a marine vessel 102 provided on a surface 104 of a body of water 106. An umbilical cable 108 is attached to the marine vessel 102, and is used to tow an assembly 110 that includes a cable control unit 112 and a tow cable 114 (referred to hereinafter as a "sensor cable"). The sensor cable 114 includes EM receivers 116 arranged along the axial length of the sensor cable 114. The sensor cable 114 can be made out of a continuous cable or out of several cable sections that are connected by an appropriate connector(s).

The EM receivers 116 can be spaced apart uniformly or non-uniformly along the axial length of the sensor cable 114. In some embodiments, an EM receiver can be an electrode, which can be made of electrically conductive material such as silver, silver chloride, gold, lead, or any other suitable metal or deposit metal or electrically conductive structure such as carbon or carbon nanotubes. An electrode can also be made of a capacitive material and coated by an insulating layer—such an electrode is known as a capacitive electrode.

The cable control unit 112 is an electronic unit that is designed to be provided in the body of water 106. The cable control unit 112 provides power to the electronic devices of the sensor cable 114, and communicates signaling with the electronic devices of the sensor cable 114. Examples of the electronic devices include the EM receivers 116, navigation devices (e.g., birds to control the movement of the sensor cable), compasses, pressure sensors, temperature sensors, conductivity sensors, and so forth The cable control unit 112 has a weight that is able to maintain the sensor cable 114 at a target depth in the body of water 106. In addition, the cable control unit 112 includes a power converter to convert main power from the marine vessel 102 to local power for processing electrical signals received from EM receivers 116 in the sensor cable 114 (as well as from other sensors).

The sensor cable 114 may also include digitizers (not shown) for digitizing signals acquired by the EM receivers. In addition, the sensor cable 114 can include mechanisms (including electrical wires and other circuitry) for delivering power through the cable to various electronic devices.

The tow cable 114 can be covered by a protective porous structure or membrane. The porous membrane provides electrical contact between the electrodes and the surrounding body of water 106, but prevents an excessive flow of water along the surface of the electrodes. The porous membrane also provides for mechanical insulation between the electrodes and the outside environment. One example of the porous membrane can be formed of POREX®, which is a form of porous plastic.

In addition to the assembly shown in FIG. 1, at least one EM source can also be present. The at least one EM source can also be towed by the marine vessel 102, or by another marine vessel. Alternatively, the at least one EM source can also be part of the sensor cable 114.

During operation, the at least one EM source propagates an EM signal into a subterranean structure 120 that is underneath a water bottom surface 122 (e.g., seafloor). The subterranean structure 120 includes a subterranean element 124 of interest (e.g., a reservoir). The EM signals affected by the subterranean structure 120 including the subterranean element 124 are detected by the EM receivers 116. The measurement data from the EM receivers 116 are processed to characterize the content of the subterranean structure 120.

The following provides a discussion of sources of noise in the sensor cable 114 that can interfere with accurate measurements by the EM receivers 116. Reference is made to FIG. 2 in the discussion below.

It is assumed that an electrode system including the EM receivers 116 (electrodes) including the sensor cable 114 of FIG. 1 is towed through the water at a speed $v_0(t)$. Due to vibration, the sensor cable 114 and the electrical wires within the sensor cable 114 that connect the electrodes are vibrating in space in all directions.

An electrode wire in the sensor cable is denoted by $\partial S(t)$ in FIG. 2—normally the electrode wire will be an integral part of the sensor cable but for clarity of some of the underlying theoretical concepts it is drawn as a separate wire. S(t) is the surface area enclosed by the electrode wire. Although one may think that a towed cable will be perfectly straight, in reality this will be not the case. One of the major factors that affect cable shape is the ballasting of the cable caused by local buoyancy along the cable. For example, a cable may generally have a buoyancy somewhat different from the local water density. A cable is kept at depth by depth steering devices ("birds") spaced a few hundred meters apart along the cable.

While at a bird location the depth of the cable is controlled and normally at the specified depth, in between birds the cable will float upwards or sink downwards, depending on whether it is relative heavy or light. The deformation—also known as cable sag—will depend on tension in the cable, tow speed and other factors. In addition, surface wave action will induce transversal string-waves through the cable. Finally, the flow of water across the cable will induce local transversal vibrations. All of these contribute to spatially and time variant deformations that may induce noise into the measurement system.

The equations that describe the measurement system are the so-called Maxwell-Faraday equations:

$$V = -\frac{d\Phi}{dt}, \text{ (Faraday's law of induction)} \quad \text{(Eq. 1)}$$

$$V = \oint_{\partial S(t)} dl \cdot (E + v \times B), \text{ (Lorenz force law)}$$

$$\Phi = \iint_{S(t)} dA \cdot B.$$

Here, $\Phi$ is the magnetic flux enclosed by the surface S(t) of the electrical wire, E is the electric field, B is the total magnetic flux density (which is assumed to be the Earth's magnetic field), and dl is a line segment along the wire $\partial S(t)$. Eq.

1 shows that there are two additive noise contributions: 1) one deriving from time changes in the flux Φ—either due to a change in the surface area S(t) or a temporal and/or lateral change in the magnetic flux density B(r,t), and 2) one deriving from the pure movements of the electrode wire in a magnetic field. Each of these two contributions can be considered in isolation.

It should be noted that towing a steady wire (a wire that does not change shape) parallel to the wire direction $$\left(\text{expressed as } \oint_{\partial S(t)} dl \cdot v_0 \times B = 0\right)$$

does not actually induce any noise. The only exception to this if there are lateral variations in the magnetic field B(x). Hence, the axial tow of a cable by itself does not induce any electromagnetic noise.

The following considers a simplified scenario in which over the full length of the cable segment there are transverse vibrations. For simplicity it may initially be assumed that the wire ∂S(t) between the electrodes is straight and parallel to the towing direction. In this case the induced voltage due to noise is given as $$V_{noise} = \oint_{\partial S(t)} dl \cdot v_t \times B,$$

where $v_t(t)$ is the transverse velocity vector.

The only components of the magnetic field that contribute to the noise voltage are those that are normal to the tow (and cable) direction. Near the equator where the earth's magnetic field is essentially horizontal, a north-south tow direction parallel to the earth's magnetic field will thus not induce any noise whereas the east-west tow direction will induce a maximum amount of noise. Towards the magnetic poles the earth magnetic field is far more vertical and the actual towing direction may be less important. The transverse vibration motion induced noise of this form scales directly with the velocity spectrum of the transverse vibrations and the length of electrode wire. In practice transverse vibrations of this type are mechanical waves traveling along the cable. The tow cable is effectively acting as a string.

Hence depending on the wavelengths of the vibrations relative to the wire length, the resulting noise will be attenuated. For example, for a wave speed of 50 m/s (meters per second), the wavelength at 0.1 Hz (hertz) equals 500 m and at 1 Hz equals 50 m. For an electrode spacing of 50 m, the induced noise at 1 Hz will be cancelled while the noise at 0.1 Hz will not be attenuated at all. Thus, the slower the wave speed of transverse waves along the cable, the more the transverse vibration motion induced noise will be attenuated.

The wave speed and the vibration velocity spectrum all depend on the mechanics of the cable design. For the speed of a wave on a cable under tension the following formula holds:

$$v = \sqrt{T/(\rho_{cable} + \rho_{addedmass})}, \qquad (Eq. 2)$$

where T is the tension in the string (N), $\rho_{cable}$ is the linear mass density of the cable (kilograms per meter), and $\rho_{added\ mass}$ is the linear mass density of the "added mass" (the displaced water). Hence a heavy cable could be beneficial as it reduces the wave speed and hence reduces the wavelength of vibration induced wire motions. However, a lighter and thus thinner cable reduces the drag and thus the longitudinal tension along the cable and also reduces the wave speed and wavelengths. In addition, such design parameters also impact the vibration velocity spectrum which is also a key parameter. However, the combination of these can be optimized through a proper cable design process.

In addition, it should be noted that in the presence of sag—which will always be there to some extent—a sudden change in tow speed will create a sudden change in the vertical profile of the tow cable. This is because a sudden tension increase or decrease will reduce or increase the sag and the corresponding change in cable shape will, in the presence of a horizontal magnetic field normal to the cable, give rise to a sudden noise pulse. Thus, it can be concluded that temporal variations in the axial tension should be minimized.

In addition to the above, any temporal change in the surface area S(t) will change the total magnetic flux through the surface area and by that induce electric noise in the system. This applies equally to vertical as well as horizontal cable vibrations. For pure vertical vibrations, a tow direction normal to the earth magnetic field will induce the maximum amount of noise. Near the magnetic poles it will be the horizontal vibrations that may create most of the induced noise. Also in this case, the shorter the wavelength of these vibrations, the more these induced noise will be attenuated because the variations in surface area S(t) are reduced. The surface area follows the displacement spectrum, and hence the change in surface area depends again directly on the transverse vibration velocity spectrum. The worst case arises when the dominant wavelength of the vibration mode equals double the spacing between electrodes, in which case the surface area will always reach its maximum.

In view of the foregoing, a mechanical characteristic of the sensor cable that can be controlled is to reduce the velocity of the traveling noise wave along the sensor cable. This can be achieved by controlling the tension of the sensor cable, by adding mass to the sensor cable, or increasing the stiffness of the tow cable. The tension and mass of the sensor cable are governed in part by the diameter of the sensor cable. Over the relevant frequency spectrum of interest for EM measurements, the noise velocity should be high enough to not be aliased and low enough to be well outside the wavenumber spectrum of the signal of interest. Also, a low noise velocity can reduce vibration in the sensor cable.

In addition, the tension of the sensor cable is controlled to reduce variations in tension experienced along the axial direction of the sensor cable. This will also alleviate noise issues.

In addition to the foregoing, another mechanical characteristic of the sensor cable 114 that can be controlled is the temporal (resonant) frequency of vibrations of the sensor cable. The resonant frequency of the sensor cable is set as high as possible, and the amplitude of such vibrations is minimized. This can be achieved by using relatively slim sensor cables of a material designed to minimize strumming. Providing a slim sensor cable means that the diameter of the sensor cable is reduced. Setting the resonant frequency to be as high as possible allows the resonant frequency of the vibration to be outside the band of interest that is the subject of EM measurements. Other properties of the sensor cable that can be used to control the resonant frequency of the vibration include the weight and density of the sensor cable.

Another target mechanical characteristic of the sensor cable to be controlled is to provide dampening between the tow cable and electrical wires within the tow cable. Dampening, such as by using a dampening medium as discussed above, enhances isolation between the tow cable and the electrical wires such that vibrations caused in the electrical wires due to vibrations of the tow cable are reduced.

In addition to, or instead of, controlling the mechanical characteristics to suppress effects of noise caused by sensor cable vibration, the arrangement of EM receivers (electrodes) on the sensor cable 114 can be configured to allow for special signal processing to remove noise from measured signals.

FIGS. 3-5 illustrate three different embodiments of configurations of electrodes (116 in FIG. 1). FIG. 3 shows a sensor cable 114A that includes electrodes 116 arranged along its length, where each successive pair of electrodes is connected by a corresponding electrical connection 202 (202_1 to 202_16 shown). In FIG. 3, the 17 electrodes depicted are identified as electrodes 116_1 to 116_17. The electrical connections between successive pairs of electrodes are referred to as electrical connections 202_1 to 202_16. Thus, in the example of FIG. 3, the electrical connection 202_1 connects the electrodes 116_1 and 116_2, the electrical connection 202_2 connects electrodes 116_2 and 116_3, and so forth.

The electrodes 116_1 to 116_17 are divided into multiple groups, with groups 1, 2, and 3 shown in FIG. 3. Group 1 includes electrodes 116_1 to 116_6, group 2 includes electrodes 116_6 to 116_11, and group 3 includes electrodes 116_11 to 116_16. Each group thus includes six electrodes, and there can be overlapping (sharing) of at least one electrode among the groups. For example, as shown in FIG. 3, electrode 116_6 is shared by groups 1 and 2. In a different implementation, each group has a distinct set of electrodes, with no sharing of electrodes between groups provided. In alternative implementations, each group can have other numbers of electrodes.

Each group includes electrodes within a predefined physical interval of the sensor cable 114A, where the interval has a length equal to a target axial spacing between a pair of electrodes for which an EM measurement signal is desired. For example, a survey operator may wish to acquire an EM measurement signal across electrodes having a spacing of 300 m. In this example, the interval of each of the groups shown in FIG. 3 would have a length of about 300 m. In group 1, the spacing between end electrodes 116_1 and 116_6 is the target axial spacing (e.g., 300 m). Conventionally, a measurement will be made between electrodes 116_1 and 116_6, and such measurement would be provided for processing.

However, in accordance with some embodiments, to enhance noise suppression, additional electrodes 116_2 to 116_5 are also provided within the interval of the target axial spacing, with measurements collected by the six electrodes 116_1 to 116_6 employed to produce an EM measurement signal defined across the target axial spacing. In other words, instead of providing an EM measurement signal using just two electrodes that are spaced apart by the target axial spacing, more than two electrodes are provided in the interval having the length of the target axial spacing. The measurements of the more than two electrodes in each group are processed to remove noise from the actual signal.

The closer spacings of electrodes within each group allow the noise signal to be recorded unaliased, such that processing can be employed to separate noise from the signal. Effectively, by using more electrodes than is necessary to acquire an EM measurement signal for a target axial spacing, measurements of higher resolution is achieved such that the noise component can be identified and separated from the actual signal.

In some embodiments, a beamforming processing technique can be used to remove noise from signal from measurements by electrodes within each of the groups. With beamforming processing, the reduced spacings between electrodes provides a higher sampling of measurements, to which filtering can be applied to remove noise. Further details regarding adaptive beamforming processing techniques are provided in U.S. Pat. Nos. 6,684,160 and 6,651,007.

FIG. 4 illustrates a sensor cable 114B according to an alternative configuration. The sensor cable 114B includes electrodes 116_1 to 116_17, and these electrodes are divided into multiple groups (group 1, group 2, group 3, etc.). However, rather than provide electrical connections between successive pairs of electrodes, as implemented in the FIG. 3 sensor cable 114A, each group has a reference electrode (which in the example of FIG. 3 in group 1 is the electrode 116_1). The remaining electrodes (116_2, 116_3, 116_4, 116_5, 116_6) of group 1 are electrically connected to the reference electrode 116_1 by corresponding electrical connections 302_1, 302_2, 302_3, 302_4, and 302_5. In the second group, the electrode 116_7 is the reference electrode, and the remaining electrodes of group 2 are each electrically connected to the reference electrode 116_7. This pattern is repeated for the remaining groups on the sensor cable 114B.

Again, signal processing can be applied to the measurements collected by more than two electrodes in each group to remove noise from signal.

FIG. 5 illustrates yet another sensor cable 114C having a different configuration. In this configuration, two electrodes 116 that are separated by seven intervening electrodes are connected by a corresponding electrical connection 402 (402_1, 402_2, 402_3, 402_4, 402_5, 402_6, 402_7 shown). The arrangement of FIG. 5 provides a larger spacing between pairs of electrodes than provided by the configurations of FIGS. 3 and 4.

In the arrangement of FIG. 5, group 1 includes electrodes 116_1, 116_2, 116_3, 116_9, 116_10, and 116_11, where electrodes 116_1 and 116_9 are electrically connected by connection 402_1, where electrodes 116_2 and 116_10 are electrically connected by connection 402_2, and where electrodes 116_3 and 116_11 are electrically connected by connection 402_3.

Effectively, in the embodiment of FIG. 5, a group is divided into a first subset of electrodes (e.g., 116_1, 116_2, 116_3) and a second subset of electrodes (e.g., 116_9, 116_10, 116_11), where each of the first subset of electrodes are connected to a corresponding one of a second subset of electrodes, and where the first and second subsets are separated by intervening electrodes (e.g., 116_4 to 116_8 in the example of FIG. 5). Note that the first and second subsets of electrodes occupy an effective physical interval that is equal to the target axial spacing for which EM measurement is desired.

Theoretically, each of the configurations shown in FIGS. 3-5 are equivalent; however, for practical reasons one or the other may provide better results depending upon the application. The FIG. 4 configuration involves the use of the least number of sensor wires, while the FIG. 5 configuration provides the largest signal strength for any EM receiver combination.

Figure 6:
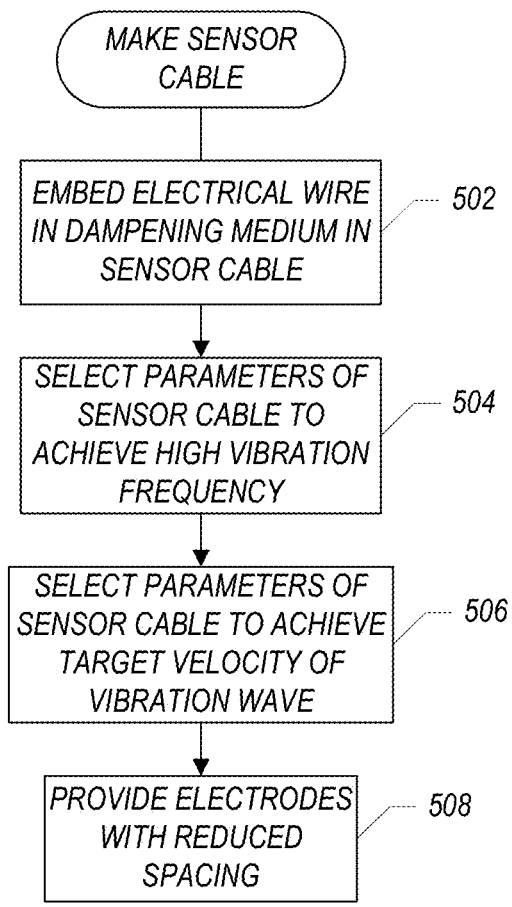
FIG. 6 is a flow diagram of a process of making a sensor cable with improved noise suppression characteristics, in accordance with an embodiment.
Figure 7:
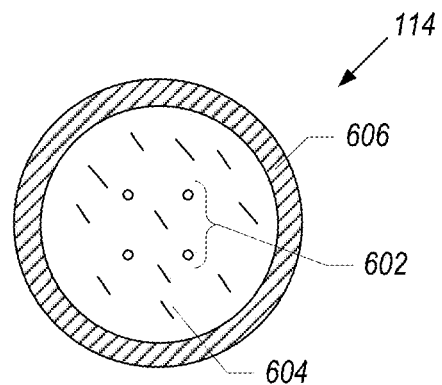
FIG. 7 is a cross-sectional view of a sensor cable according to an embodiment.

FIG. 6 illustrates a process of making a sensor cable having enhanced noise suppression characteristics, in accordance with some embodiments. Electrical wires in the sensor cable are embedded (at 502) in a dampening medium within the sensor cable. For example, as shown in FIG. 7, which illustrates a cross-sectional view of the sensor cable 114, electrical wires 602 are provided within a dampening medium 604 within an axial bore defined by a housing 606 of the sensor cable 114. The dampening medium 604 serves to isolate movement (vibration) of the housing 606 of the sensor cable 114 from the electrical wires 602 such that effect of vibration of the housing 606 is attenuated at the electrical wires 602.

The parameters of the sensor cable are selected (at 504) to achieve a high vibration frequency. Parameters that can be selected include the diameter of the sensor cable 114, the weight of the sensor cable 114, and/or the density of the sensor cable 114. As noted above, providing a high vibration frequency allows the vibration frequency to be outside of the frequency range of interest for EM measurements collected by the electrodes 116 of the sensor cable 114.

The parameters of the sensor cable are also selected (at 506) to achieve a desired velocity of a vibration wave. This can be performed by adjusting the tension, mass, and/or diameter of the sensor cable.

Electrodes with reduced spacing are provided (at 508) in the sensor cable 114, to allow for a signal processing technique to be applied for filtering noise from signals.

Figure 8:
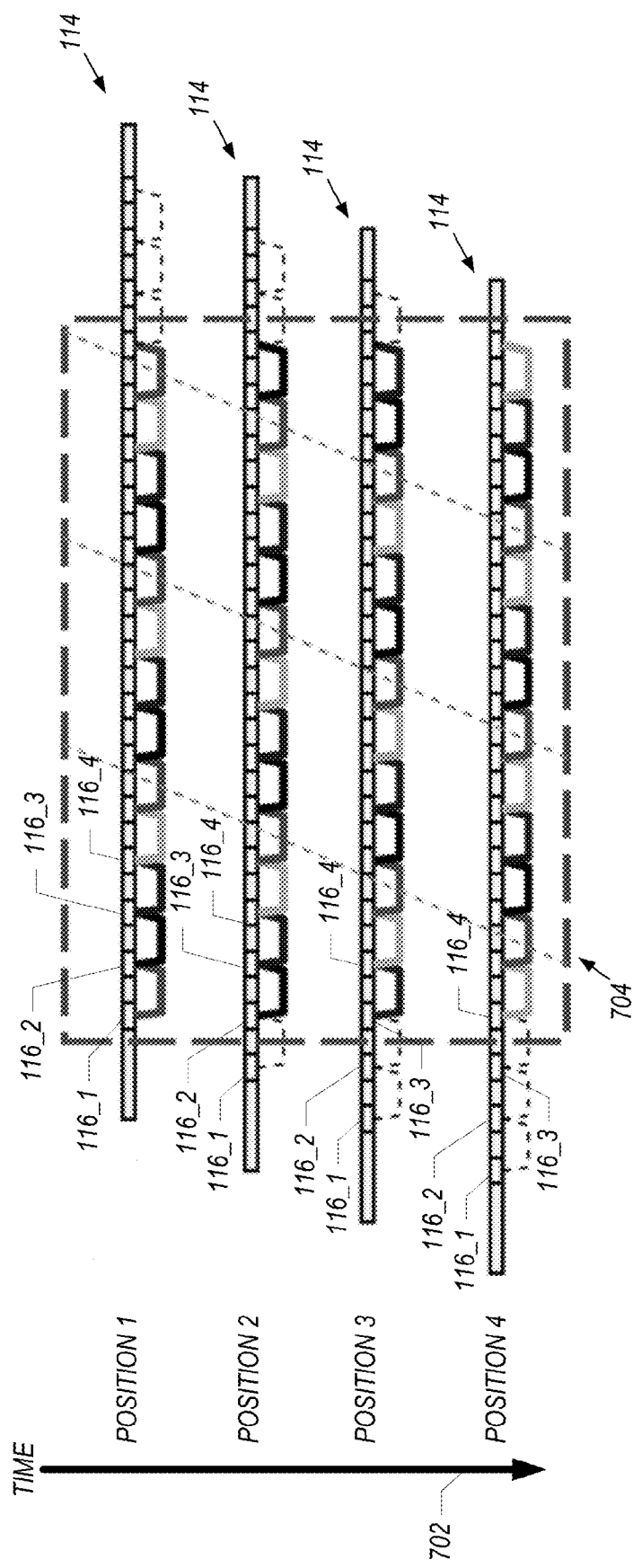
FIG. 8 illustrates a motion correction technique according to an embodiment.

In addition to providing noise suppression caused by vibrations in the sensor cable, some embodiments of the invention can also provide motion correction for EM receivers of the sensor cable 114A (configured according to FIG. 3). The sensor cable 114A that is towed through a body of water is continually moving at a certain velocity. Ideally, it is desirable that a particular EM receiver be stationary (in other words, the EM receiver stays in the same position during the period of data collection). FIG. 8 shows a sensor cable that has moved to different positions over time (represented by arrow 702). Four positions (along the longitudinal direction or direction of tow) are shown in FIG. 8: position 1 (which is at the initial time in FIG. 8), position 2 (which is at a time after the time associated with position 1), position 3 (which is at a time that is after the time of position 2), and position 4 (which is at a time after the time of position 3).

At position 1, EM receiver 116_1 is used for measuring signals associated with a particular location (704 in FIG. 8) with respect to the subterranean structure. However, after some amount of time at which the sensor cable 114A has moved to position 2, the next EM receiver 116_2 is used to make measurements at the particular location 704 with respect to the subterranean structure. Similarly, at position 3, the EM receiver 116_3 is used to make measurements at the particular location 704, and at position 4, EM receiver 116_4 is used to make measurements at the particular location 704. During signal processing of the measurements collected by the EM receivers, for the particular location 704 shown in FIG. 8, measurements from successively different EM receivers are selected for processing for the particular location 704.

Thus, as shown in FIG. 8, as the sensor cable 114A continually moves, different successive EM receivers are used to perform measurements of a particular location with respect to a subterranean structure. By using the technique shown in FIG. 8, it appears that the sensor cable 114A is stationary.

Figure 9:
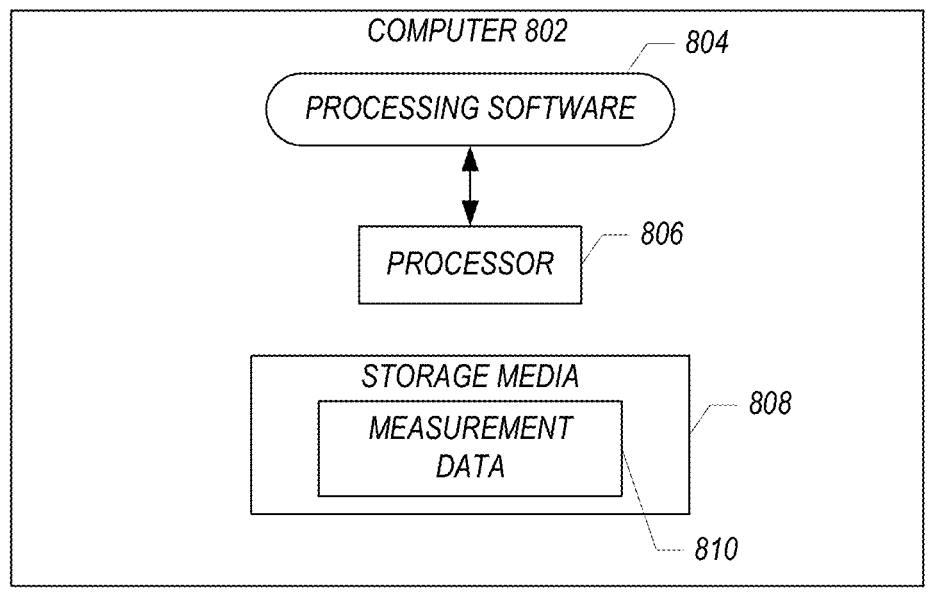
FIG. 9 is a block diagram of a computer incorporating processing software according to an embodiment.

FIG. 9 shows a computer 802 that includes processing software 804 that can perform various tasks according to some embodiments, including applying signal processing to groups of measurements collected by EM receivers in the corresponding groups. The processing software 804 is executable on a processor 806, which is connected to a storage media 808 that contains measurement data 810 collected by EM receivers in a sensor cable.

The computer 802 may be deployed on the marine vessel 102 of FIG. 1, or alternatively, the computer 802 may be deployed at a remote location on a land surface, for example.

Instructions of the processing software 804 are loaded for execution on the processor 806. The processor includes microprocessors, microcontrollers, processor modules or subsystems (including one or more microprocessors or microcontrollers), or other control or computing devices. As used here, a "processor" can refer to a single component or to plural components (e.g., one or multiple CPUs in one or multiple computers).

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of surveying a subterranean structure, comprising:
for acquiring an electromagnetic (EM) measurement signal across EM receivers having a target axial spacing, providing a group of more than two EM receivers in an interval defined by the target axial spacing along a sensor cable, wherein spacing between successive EM receivers in the group is less than the target axial spacing; and
acquiring EM measurements using the EM receivers in the group; and
communicating the acquired EM measurements to a computer that processes the acquired EM measurements to generate the EM measurement signal defined across the target axial spacing, and wherein providing more than two EM receivers in the interval defined by the target axial spacing causes extra sampling of EM measurements defined across the generation of the EM measurement signal defined across the target axial spacing, the extra sampling of EM measurements used for filtering of noise from the EM measurement signal.

2. The method of claim 1, wherein the EM receivers are electrodes.

3. The method of claim 2, further comprising electrically connecting successive pairs of electrodes in the interval.

4. The method of claim 2, wherein one of the electrodes in the group is a reference electrode, the method further comprising electrically connecting each of the other electrodes in the group to the reference electrode.

5. The method of claim 2, wherein each of a first subset of electrodes in the group is connected to a corresponding one of a second subset of electrodes in the group, wherein the first and second subsets are separated by intervening electrodes.

6. The method of claim 1, further comprising:
providing a second group of more than two EM receivers in a second interval defined by the target axial spacing, wherein spacing between successive EM receivers in the second group is less than the target axial spacing; and
acquiring EM measurements using the EM receivers in the second group.

7. A system comprising:
at least one processor configured to:
receive electromagnetic (EM) measurements from a group of more than two EM receivers in an interval defined by a target axial spacing for an EM signal along a sensor cable, wherein spacing between successive EM receivers in the group is less than the target axial spacing to cause extra sampling of EM measurements for generation of the EM measurement signal defined across the target axial spacing; and
apply signal processing to the received EM measurements, wherein the signal processing comprises:
generating the EM measurement signal defined across the target axial spacing using the EM measurements acquired by the EM receivers in the group, and
filtering noise from the EM measurement signal using the extra sampling of EM measurements.

8. The method of claim 7, wherein the extra sampling of EM measurements comprises EM measurements that are in addition to EM measurements acquired by two of the EM receivers in the group that are spaced apart by the target axial spacing.

9. The system of claim 7, wherein the extra sampling of EM measurements comprises EM measurements that are in addition to EM measurements acquired by two of the EM receivers in the group that are spaced apart by the target axial spacing.

10. A method comprising:
receiving electromagnetic (EM) measurements from a group of more than two EM receivers in an interval defined by a target axial spacing for an EM measurement signal along a sensor cable, wherein spacing between successive EM receivers in the group is less than the target axial spacing to cause extra sampling of EM measurements for generation of the EM measurement signal defined across the target axial spacing; and
applying processing to the received EM measurements, the processing:
generating the EM measurement signal defined across the target axial spacing using the EM measurements acquired by the EM receivers in the group, and
filtering noise from the EM measurement signal using the extra sampling of EM measurements.

11. The method of claim 10, wherein applying the processing comprises applying beamforming to the received EM measurements.

12. The method of claim 10, further comprising:
applying motion correction to compensate for tow movement of the sensor cable by using measurements from successive EM receivers to process for a particular location.

13. The method of claim 10, wherein the extra sampling of EM measurements comprises EM measurements that are in addition to EM measurements acquired by two of the EM receivers in the group that are spaced apart by the target axial spacing.

14. The method of claim 7, wherein the target axial spacing for the EM measurement signal is the target axial spacing between EM receivers for which the EM measurement signal is to be acquired.

* * * * *